Dec. 25, 1951     J. H. SCHMID     2,580,198
CHECK VALVE AND VENTING MEANS FOR HYDRANTS
Filed April 4, 1947
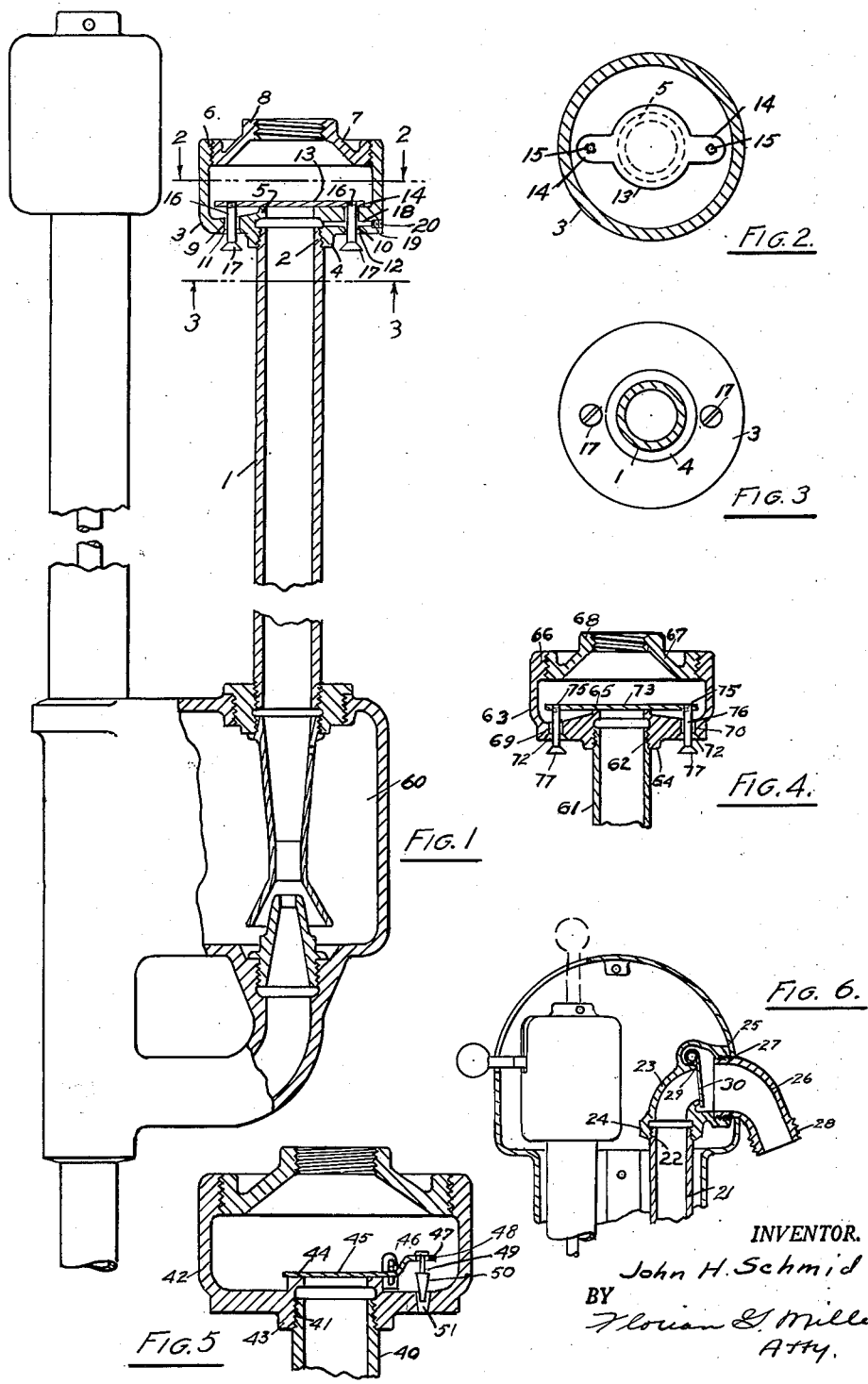
INVENTOR.
John H. Schmid
BY
Florian G. Miller
Atty.

Patented Dec. 25, 1951

2,580,198

UNITED STATES PATENT OFFICE 2,580,198

CHECK VALVE AND VENTING MEANS FOR HYDRANTS

John H. Schmid, Erie, Pa., assignor to J. A. Zurn Manufacturing Company, Erie, Pa., a corporation of Pennsylvania Application April 4, 1947, Serial No. 739,421

10 Claims. (Cl. 137—13)

This invention relates generally to hydrants and more particularly to check valve and venting means for a non-freezing hydrant.

No adequate means has heretofore been provided in non-freezing hydrants to prevent water from passing back into the water line of the hydrant and standing therein above the frost line in the earth, thereby freezing the water and bursting the pipe. No adequate venting means has heretofore been provided in conjunction with means for preventing water from passing back into the water line of a non-freezing hydrant. Furthermore, no means has heretofore been provided for draining the water line above the check valve in a hydrant.

It is, accordingly, an object of my invention to overcome the above and other defects in check valve and venting means for a non-freezing hydrant and it is more particularly an object of my invention to provide a check valve and venting means for a non-freezing hydrant which is simple in construction, efficient in operation, economical in cost, and economical in manufacture.

Another object of my invention is to provide a novel check valve for a non-freezing hydrant which prevents water from passing back into the water line and which permits a maximum flow of water.

Another object of my invention is to provide novel venting means in conjunction with a check valve for a non-freezing hydrant.

Another object of my invention is to provide novel means for closing off the vents in the water line of a non-freezing hydrant when the check valve is open and the water is flowing, and further means for draining the water from the water line above the check valve when it is closed and the vent is open.

Another object of my invention is to provide a check valve for a non-freezing hydrant wherein the maximum flow of water is permitted.

Another object of my invention is to provide a check valve which may be quickly and easily freed when frozen to its seat.

Other objects of my invention will become evident from the following detailed description, taken in conjunction with the accompanying drawings, in which Fig. 1 is a vertical sectional view of my novel check valve and venting means on the upper end of a water line of a non-freezing hydrant;

Fig. 2 is a view taken on the line 2—2 of Fig. 1;

Fig. 3 is a view taken on the line 3—3 of Fig. 1;

Fig. 4 is a vertical sectional view of a modified form of check valve for a non-freezing hydrant;

Fig. 5 is a vertical sectional view of another modified form of my novel check valve; and Fig. 6 is another modified form of my invention.

Referring now to the drawings, Figs. 1, 2, and 3 show a water line 1 of a non-freezing hydrant extending below the frost line of the earth having a threaded portion 2 on the upper end thereof for receiving a cup-shaped head 3 having a threaded flanged portion 4 for threadably engaging the threaded portion 2 of the water line 1, an inner upwardly extending seating portion 5, and an internally threaded portion 6 for threadably receiving a threaded cap member 7 having a threaded hub portion 8 adapted to receive a threaded pipe, coupling, or any other suitable means for conveying liquid from the water line 1. The head 3 has oppositely disposed apertures 9 and 10 with countersunk portions 11 and 12. A flat check valve 13 seats on seating portion 5 of the head 3 and has outwardly extending arms 14 with threaded apertures 15 for threadably engaging depending screw bolts 16. The screw bolts 16 have tapered heads 17 with tapered portions complementary to the tapered countersunk portions 11 and 12 of apertures 9 and 10 so that the tapered heads 17 seat in and sealingly engage the countersunk portions 11 and 12 of apertures 9 and 10 when the water flows through the water pipe 1 and causes the check valve 13 to move upwardly away from its seat 5. A vent 18 extends laterally in the threaded apertured flanged portion 4 to vent the pipe line 1 to aperture 10 and it has a threaded portion 19 on the outer end thereof for receiving a threaded plug 20 to prevent dirt or other deleterious matter from passing into the vent line 18. It will be observed that the vent line 18 may be easily cleaned by removing the plug 20 and by extending a cleansing brush or the like therethrough. Furthermore, the check valve 13 seals the upper end of the aperture 10 when it engages the seat 5 while the aperture 9 is open to drain water from the head 3.

In operation, when water passes through the water line 1 under pressure, it lifts the check valve 13 away from the seat 5, thereby permitting the flow of water out of the head 3 for any purpose desired. When the check valve 13 is raised, the tapered headed portions 17 of the screw bolts 16 depending therefrom seat in the countersunk portions 11 and 12 of the apertures 9 and 10, thereby preventing leakage of water from the head 3. When the valve (not shown) is shut off in the water line 1, the check valve 13 will seat on and sealingly engage the seat 5 as shown in Fig. 1, thereby preventing back flow of water into the water line 1. The water standing in water line 1 below the check valve 13 is drawn downwardly into a chamber 60 in the hydrant below the frost line of the earth, thereby preventing any freezing of the water. When the water pipe 1 above the chamber 60 in the hydrant is free of water, the vent 18 is open to the atmosphere in that the tapered head 17 of screw bolt 16 in the aperture 10 is unseated from the countersunk portion 12 of the aperture 10 in the head 3. The water in the head 3 is drained through the aperture 9 therein when the tapered head 17 of the bolt 16 is unseated from the countersunk portion 11 of aperture 9 in that the check valve 13 does not seal the aperture 9 when it sealingly engages the seat 5. Although I have shown the screw bolts 16 depending from the check valve 13 as threaded members, it will be evident that they may be pressed into apertures in the check valve 13 or they may be fastened in any other suitable manner. Furthermore, the check valve 13 may take many different forms without departing from my invention. When the check valve 13 is frozen to the seat 5 in the head 3, it may be moved away therefrom manually by pushing upwardly on the screw bolts 16.

In the modified form of my invention shown in Fig. 6 I have shown a water line 21 of a non-freezing hydrant having a threaded portion 22 on the upper end thereof for threadably engaging a threaded flanged portion 24 of a right-angled fitting 23. Fitting 23 also has an internally threaded flanged portion 25 for threadably engaging the threaded portion 27 of a downwardly extending angular fitting 26. The fitting 26 has a threaded portion 28 for threadably engaging any suitable form of coupling member to couple it to a hose or the like wherein water may be transmitted to the point where it is desired for use. The fitting 23 has a seating portion 29 substantially parallel but slightly inclined with reference to the axis of the water line 1 and a hinged check valve 30 seats thereon as shown in Fig. 6 when no water is flowing through the water line 1. The operation of this device will be evident upon observation in that when water is not flowing, the hinged check valve 30 will seat on the seating portion 9 of the fitting 3 and no water will flow back into the water pipe 1. Any suitable venting means may be provided.

In Fig. 5 I have shown another modified form of my invention in which a water line 40 has a threaded portion 41 on the upper end thereof for receiving a cup-shaped head 42 having a threaded hub portion 43. The head 42 has an upwardly extending circular shaped seating portion 44 upon which seats a flat check valve 45 hinged by the pin 46 and having an off-set portion 47 with an aperture 48 for receiving a headed pin 49 with an enlarged tapered seating portion 50 for seating in a tapered aperture 51 in the head 42. It will thus be seen that when no water is flowing, the check valve 45 will sealingly engage the seat 44 of the head 42 as shown in Fig. 5 and no water will flow back into the water line 40 but water standing above the check valve 45 will drain off through aperture 51. When water is flowing under pressure through the water line 40, the check valve 45 will move upwardly and the off set portion 47 thereof will move downwardly, thereby causing the tapered seating portion 50 of the pin 49 to sealingly engage the tapered aperture 51 in the bottom portion of the head 42 to prevent water from leaking from the head 42 when water is flowing therethrough. Any suitable venting means may be provided.

In Fig. 4, I have shown a check valve similar to Fig. 1, utilizing both apertures as drain apertures. The upwardly extending pipe 61 has a threaded portion 62 for threadably receiving a cup-shaped head 63 with a threaded hub portion 64. A valve seat 65 is disposed centrally of the head 63. The head 63 has an internally threaded portion 66 for threadably engaging a threaded cap member 67 having a threaded hub portion for connection to hose coupling or the like. The head 63 has apertures 69 and 70 with countersunk portions 72 for draining liquid from the head 63. A flat check valve 73 seats on the valve seat 65 and has threaded apertures 75 for engaging threaded bolts 76 having tapered heads 77 complementary to the countersunk portions 72 of apertures 69 and 70 and adapted to sealingly engage the apertures 69 and 70 when the check valve 73 is away from the seat 65. Any suitable venting means (not shown) may be provided in the head 63, or in the surge tank of the hydrant at the foot of the pipe 61. The operation of this check valve is the same as the check valve shown in Fig. 1, except for the different venting means.

It will thus be seen from this foregoing description that I have provided a novel check valve which may be utilized in any device wherein a fluid line extends vertically and venting means and check valve means are desirable on the upper end thereof, although my invention is particularly applicable to non-freezing hydrants wherein it is necessary to prevent water from passing back into the water line extending below the frost line of the earth in order to prevent freezing of the water, which would otherwise stand in the water line above the freezing point of the earth. In these devices it is further desirable to have venting means for the water line 1 as well as means for closing the venting means when water flows and means for draining water from the line above the check valve when it is seated.

Various changes may be made in the specific embodiment of my invention without departing from the spirit thereof, or from the scope of the appended claims.

What I claim is:

1. In combination with a vertically extending fluid line, a cup-shaped head attached to the upper end of said fluid line having an aperture in the lower portion thereof, a passageway in said head communicating with said fluid line, and a seat in said cup surrounding said passageway and in a different plane than said aperture in said cup, a check valve for sealingly engaging said seat, and a member rigidly attached to said check valve and extending from said check valve and movable therewith for sealingly engaging said aperture in the lower portion of said head when said check valve moves away from said seat in said head when liquid flows through said water line, said member being manually engageable externally of said head to manually unseat said check valve.

2. In combination with a non-freezing hydrant, an upwardly extending water line, a cup-shaped head attached to the upper end of said water line having oppositely disposed apertures in the lower portion thereof, a passageway in said head communicating with said water line, and an internal seat in said head surrounding said passageway and in a different plane than the apertures in said head, a check valve sealingly engageable with said seat, and sealing members depending from said check valve and rigidly attached thereto extending through the apertures in the bottom of said head for sealing said apertures in said head when water flows through said water line and moves said check valve from said seat in said head, said sealing members being manually engageable externally of said head to unseat said check valve.

3. In combination with a non-freezing hydrant, a vertically extending water line, a closed member secured to the upper end of said water line having oppositely disposed apertures, a passageway in said closed member communicating with said water line, and a centrally disposed internal seating portion in said head surrounding said passageway and in a different plane than the apertures in said head, a check valve for sealingly engaging the seating portion of said member, and depending sealing members on said check valve rigidly attached thereto extending through said apertures in said member for sealing said apertures when said check valve is in an unseated position, said sealing members being manually engageable externally of said closed member to unseat said check valve.

4. In combination with a non-freezing hydrant as set forth in claim 3 wherein said member has a laterally extending venting aperture in the portion of said passageway between said seating portion and said water line and extending into one of said apertures.

5. In combination with a non-freezing hydrant, a vertically extending water pipe, a head attached to said water pipe having oppositely disposed countersunk apertures and a centrally disposed internal seating portion aligned with said water pipe, a check valve for sealingly engaging said seating portion of said head, depending members from said check valve extending through said apertures in said head and having tapered headed portions complementary to said tapered countersunk portions of said apertures in said head to sealingly engage said countersunk portions when said check valve moves away from said seating portion of said head upon flow of fluid, and a venting aperture extending laterally in the lower portion of said head to one of said apertures.

6. In combination with a non-freezing hydrant as set forth in claim 5 wherein the upper inner portion of said head is internally threaded and a threaded adapter is threadably engaged therewith defining a cover for said head and a threaded aperture for a hose connection.

7. In combination with a vertically extending fluid line, a closed head having a drain aperture, a horizontal and a vertically extending venting aperture, a passageway in said head communicating with said fluid line, and a seat surrounding said passageway, a check valve for sealingly engaging said seat and said vertically extending venting aperture, and members rigidly attached to and movable with said check valve for sealingly engaging the apertures in said head when flowing fluid unseats said check valve, said drain aperture communicating with said closed head downstream of the valve seat and the vent apertures communicating with said closed head upstream of the valve seat.

8. In combination with a non-freezing hydrant, a water pipe, a closed head on said pipe having venting apertures, a drain aperture, a passageway in said head communicating with said water pipe, and a seat surrounding said passageway, a check valve for sealingly engaging said seat wherein water thereabove passes out of the drain aperture in said head, and members rigidly attached to and movable with said check valve when water flows through said water pipe to seal said apertures in said head, said drain aperture communicating with said closed head downstream of said valve seat and the vent apertures communicating with said closed head upstream of said valve seat.

9. In combination with a discharge line, a housing on the end of said discharge line, a passageway in said housing communicating with said discharge line, a valve seat surrounding said passageway, and a vent line in said housing, a check valve in said housing for sealing said discharge line upon sealing engagement with said seat, said venting means in said housing being adapted to vent said discharge line upon the sealing thereof by said check valve, means associated with said check valve for closing said venting means when said check valve unseals said discharge line, and means for draining the liquid from said housing when said check valve seals said discharge line.

10. In combination with a non-freezing hydrant as set forth in claim 3 wherein said closed member has a venting aperture extending radially outwardly from said passageway through and beyond one of said apertures, for venting said passageway to atmosphere when said check valve sealingly engages the seating portion in said closed member, said portion of said venting aperture extending beyond said aperture in said closed member having a removable plugging member disposed therein.

JOHN H. SCHMID.

REFERENCES CITED

The following references are of record in the file of this patent:

UNITED STATES PATENTS

| Number | Name | Date |
|---|---|---|
| 397,088 | Mills | Jan. 29, 1889 |
| 761,366 | Farnsworth | May 31, 1904 |
| 922,131 | Gold | May 18, 1909 |
| 1,215,071 | Steedman | Feb. 6, 1917 |
| 1,224,546 | Hull | May 1, 1917 |
| 1,501,799 | Neumeyer | July 15, 1924 |
| 1,577,637 | Hess | Mar. 23, 1926 |
| 2,257,199 | Sloan | Sept. 30, 1941 |
| 2,233,200 | Dreyer | Feb. 25, 1941 |

FOREIGN PATENTS

| Number | Country | Date |
|---|---|---|
| 9,043 | Switzerland | of 1902 |
| 10,134 | Denmark | of 1907 |
| 25,156 | Germany | of 1882 |
| 236,645 | Germany | of 1911 |
| 413,804 | France | of 1910 |
| 460,088 | France | Sept. 25, 1913 |
| 705,696 | Germany | of 1941 |